US009325875B2

(12) United States Patent
Kawanishi

(10) Patent No.: US 9,325,875 B2
(45) Date of Patent: Apr. 26, 2016

(54) READING CONTROL APPARATUS AND READING CONTROL METHOD

(71) Applicant: CANON KABUSHIKI KAISHA, Tokyo (JP)

(72) Inventor: Masahiro Kawanishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/638,625

(22) Filed: Mar. 4, 2015

(65) Prior Publication Data
US 2015/0264214 A1 Sep. 17, 2015

(30) Foreign Application Priority Data

Mar. 11, 2014 (JP) ................................. 2014-048069

(51) Int. Cl.
H04N 1/60 (2006.01)
H04N 1/028 (2006.01)
H04N 1/00 (2006.01)

(52) U.S. Cl.
CPC ....... *H04N 1/02885* (2013.01); *H04N 1/00005* (2013.01); *H04N 1/00013* (2013.01); *H04N 1/00037* (2013.01); *H04N 1/00082* (2013.01); *H04N 1/00997* (2013.01); *H04N 1/0282* (2013.01); *H04N 1/02895* (2013.01); *H04N 2201/0081* (2013.01)

(58) Field of Classification Search
None
See application file for complete search history.

(56) References Cited

U.S. PATENT DOCUMENTS

| 5,185,676 | A  | * | 2/1993  | Nishiberi  | G02B 26/101 250/236   |
|-----------|----|---|---------|------------|------------------------|
| 5,241,330 | A  | * | 8/1993  | Kawabata   | G02B 13/0005 347/255  |
| 5,570,183 | A  | * | 10/1996 | Wiles      | G02B 26/12 250/235    |
| 5,929,979 | A  | * | 7/1999  | Okino      | G02B 26/123 355/60    |
| 6,078,381 | A  | * | 6/2000  | Suzuki     | G03F 7/70066 355/53   |
| 6,178,029 | B1 | * | 1/2001  | Kamikubo   | G02B 26/123 250/236   |
| 6,433,907 | B1 | * | 8/2002  | Lippert    | G02B 26/08 359/201.1  |
| 6,449,399 | B1 | * | 9/2002  | Yamamoto   | H04N 1/02409 358/506  |
| 7,450,284 | B2 | * | 11/2008 | Tomioka    | G02B 13/0005 359/204.1 |
| 8,077,288 | B2 | * | 12/2011 | Kawashima  | G03B 27/54 355/53     |

(Continued)

FOREIGN PATENT DOCUMENTS

JP 2005-214734 8/2005

*Primary Examiner* — Madelein Nguyen
(74) *Attorney, Agent, or Firm* — Fitzpatrick, Cella, Harper & Scinto

(57) ABSTRACT

A reading control apparatus that causes a reading apparatus including a light source and a sensor configured to receive light reflected by an original, to read the original, executes control for changing the irradiation angle of the light source with respect to the original. The control is executed to change the irradiation angle for one light source. Read images of the original corresponding to respective changed irradiation angles are acquired based on reflected beams that correspond to the respective irradiation angles and have been received by the sensor. The region of a correction target on the original is detected based on the acquired read images.

20 Claims, 7 Drawing Sheets

(56) References Cited

U.S. PATENT DOCUMENTS

| | | | |
|---|---|---|---|
| 2002/0039221 A1* | 4/2002 | Shiraishi | H04N 1/506 359/204.1 |
| 2003/0020801 A1* | 1/2003 | Yamaguchi | G02B 26/125 347/259 |
| 2003/0075733 A1* | 4/2003 | Yamazaki | H01L 21/2026 257/200 |
| 2003/0081191 A1* | 5/2003 | Nishi | G03F 7/70058 355/69 |
| 2004/0080718 A1* | 4/2004 | Kojima | G03B 21/14 353/55 |
| 2005/0128546 A1* | 6/2005 | Kandori | G02B 26/101 359/202.1 |
| 2005/0280693 A1* | 12/2005 | Tomioka | H04N 1/40037 347/233 |
| 2007/0041070 A1* | 2/2007 | Ishibe | G02B 26/0833 359/215.1 |
| 2007/0047085 A1* | 3/2007 | Matsumoto | H04N 1/0473 359/566 |
| 2009/0002780 A1* | 1/2009 | Kang | H04N 1/0049 358/497 |
| 2009/0010020 A1* | 1/2009 | Katsumata | G03B 27/54 362/554 |
| 2009/0015892 A1* | 1/2009 | Kawamoto | G02B 26/127 359/198.1 |
| 2009/0322846 A1* | 12/2009 | Kashimura | B41J 2/471 347/129 |
| 2010/0044441 A1* | 2/2010 | Cohen | G01N 21/251 235/469 |
| 2010/0245940 A1* | 9/2010 | Lai | H04N 1/03 358/474 |
| 2011/0058230 A1* | 3/2011 | Soeda | G02B 26/105 358/474 |
| 2011/0116835 A1* | 5/2011 | Naito | G02B 26/123 399/151 |
| 2011/0141217 A1* | 6/2011 | Ichii | B41J 2/471 347/246 |
| 2013/0107286 A1* | 5/2013 | Shukuya | G03G 15/5058 358/1.5 |
| 2013/0148184 A1* | 6/2013 | Azuma | G02B 21/08 359/223.1 |
| 2013/0170007 A1* | 7/2013 | Kurashige | G02B 5/32 359/24 |
| 2013/0176374 A1* | 7/2013 | Kurokawa | G02B 13/0005 347/224 |
| 2013/0222865 A1* | 8/2013 | Iwamatsu | G02B 6/0051 358/484 |
| 2013/0267095 A1* | 10/2013 | Heo | H01L 21/3086 438/703 |
| 2015/0249104 A1* | 9/2015 | Ota | G07D 7/121 250/208.1 |

* cited by examiner

F I G. 2
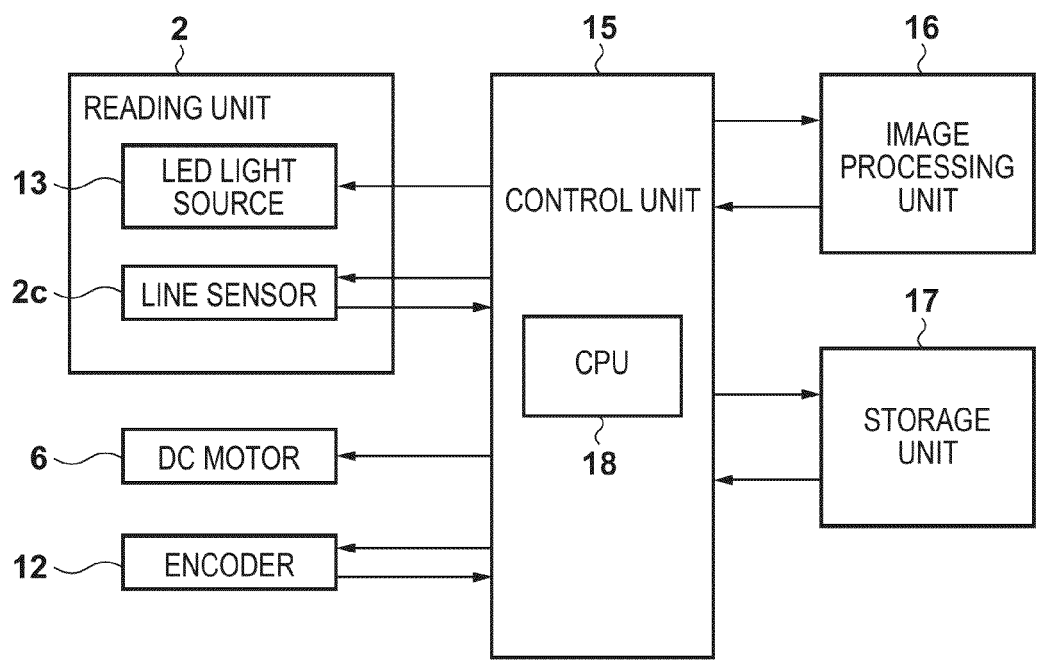
F I G. 3
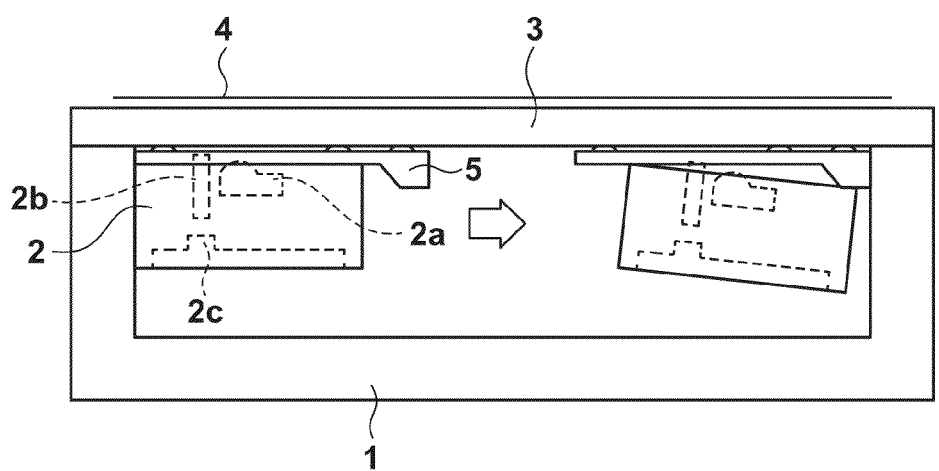

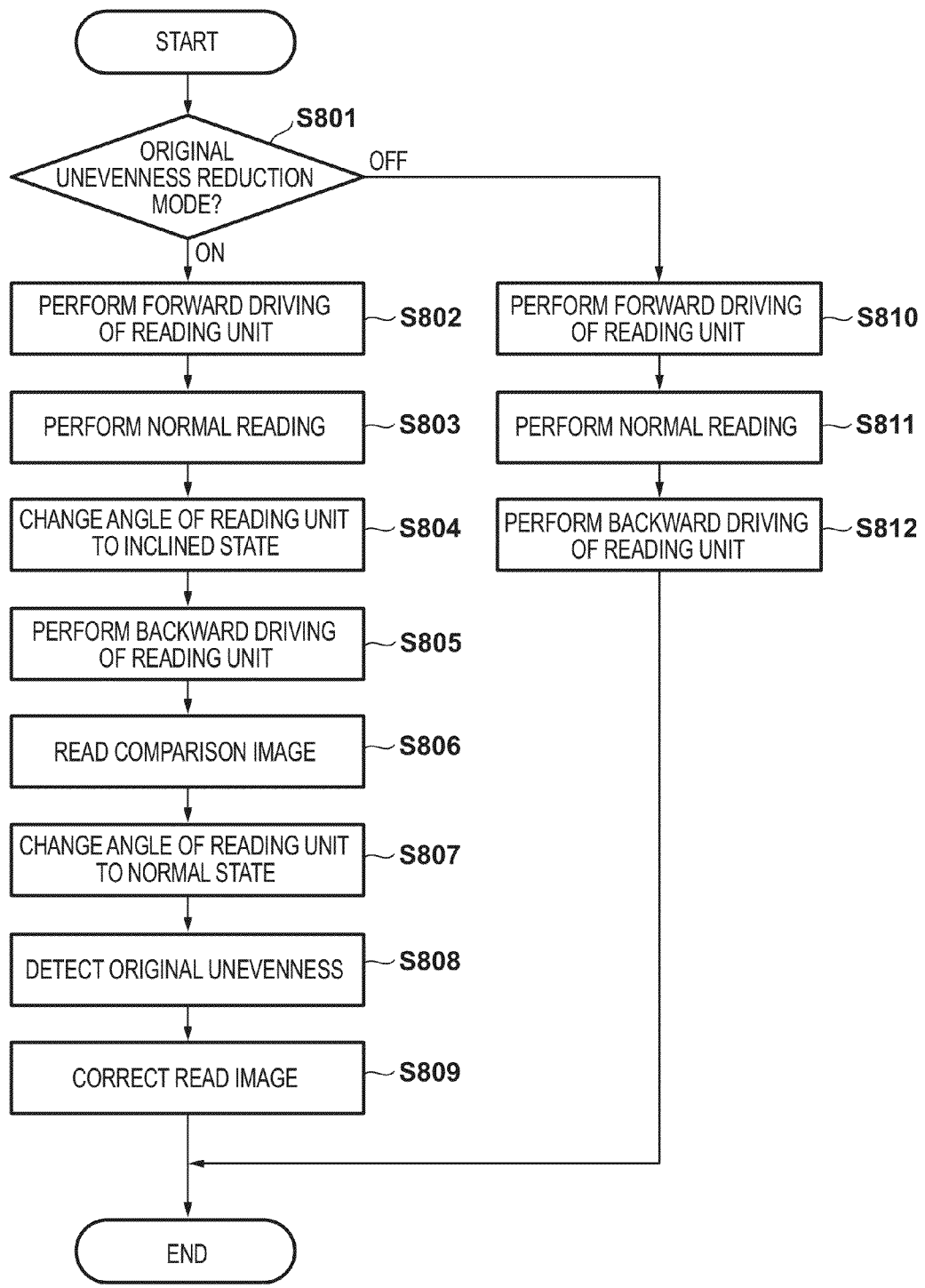

READING CONTROL APPARATUS AND READING CONTROL METHOD

BACKGROUND OF THE INVENTION

1. Field of the Invention

The present invention relates to a reading control apparatus and reading control method for causing a reading apparatus to read an original.

2. Description of the Related Art

Japanese Patent Laid-Open No. 2005-214734 describes a method of acquiring a plurality of image data by capturing a reading target original at different irradiation angles using a plurality of illumination components. Japanese Patent Laid-Open No. 2005-214734 also describes a method of detecting a paper wrinkle based on the plurality of image data.

However, in Japanese Patent Laid-Open No. 2005-214734, a plurality of illumination components are necessary for irradiation with light at a plurality of irradiation angles, thus upsizing the apparatus.

SUMMARY OF THE INVENTION

An aspect of the present invention is to eliminate the above-mentioned problems with the conventional technology. The present invention provides a reading control apparatus and reading control method capable of appropriately detecting the region of a correction target on an original even when a reading apparatus includes only one light source that irradiates an original with light.

The present invention in one aspect provides a reading control apparatus that causes a reading apparatus including a light source configured to irradiate an original on an original table with light, and a sensor configured to receive light reflected by the original, to read the original, comprising: a changing unit configured to execute control for changing an irradiation angle of the light source with respect to the original; an acquisition unit configured to acquire read images of the original corresponding to respective irradiation angles changed by the changing unit, based on reflected beams that correspond to the respective irradiation angles and have been received by the sensor; and a detection unit configured to detect a region of a correction target on the original based on the read images acquired by the acquisition unit, wherein the changing unit executes the control to change the irradiation angle for one light source.

According to the present invention, even when a reading apparatus includes only one light source that irradiates an original with light, the region of a correction target on an original can be detected appropriately.

Further features of the present invention will become apparent from the following description of exemplary embodiments with reference to the attached drawings.

BRIEF DESCRIPTION OF THE DRAWINGS

FIG. 2 is a block diagram showing the block arrangement of a control unit and its periphery in the image reading apparatus;

FIG. 3 is a view for explaining the angle changing mechanism of the reading unit;

FIG. 8 is a flowchart showing the control procedures of image reading processing.

DESCRIPTION OF THE EMBODIMENTS

Figure 1:
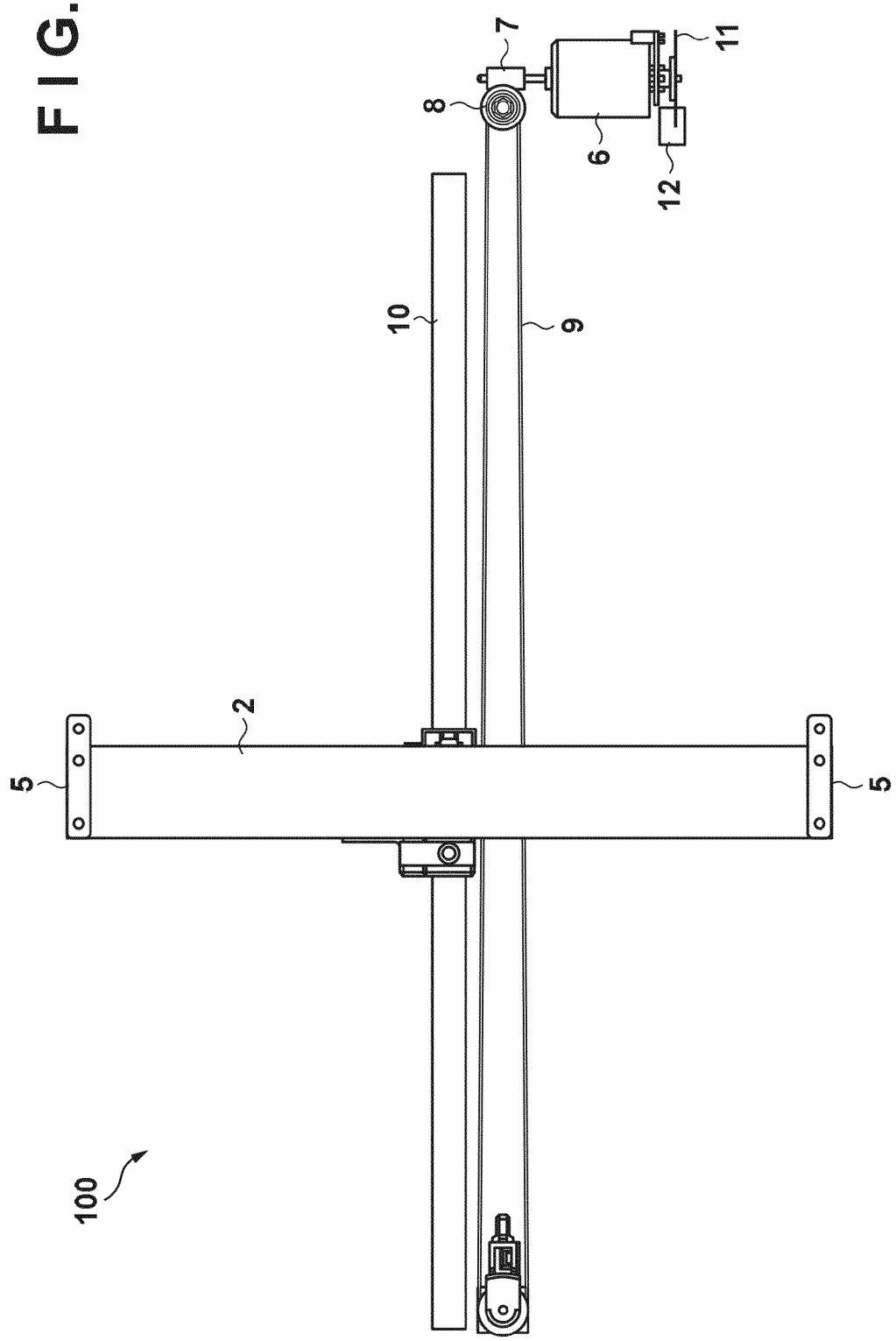
FIG. 1 is a view showing the arrangement of a reading unit and its periphery in an image reading apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same parts, and a repetitive description thereof will be omitted.

FIG. 1 is a view showing the arrangement of the reading unit and its periphery in an image reading apparatus according to this embodiment. FIG. 2 is a block diagram showing the block arrangement of a control unit and its periphery. FIG. 1 is a view when viewed from above an image reading apparatus 100. The flatbed image reading apparatus 100 will be explained as an example of an apparatus that optically reads an original on an original table. As shown in FIG. 2, a reading unit 2 includes an LED light source 13 and line sensor 2c for reading, and constitutes a unit-magnification optical system. The line sensor 2c is arrayed in the top-to-bottom direction in FIG. 1, and this array direction will be defined as a main scanning direction. A direction (right-and-left direction in FIG. 1) perpendicular to the main scanning direction will be defined as a sub-scanning direction. While the reading unit 2 moves relatively to the original table in the sub-scanning direction along a guide shaft 10, an original can be scanned to read an image by using the LED light source 13 and the line sensor 2c. The original is placed on a glass surface serving as the original table, and the reading unit 2 can also read the width of the original in the widthwise or lengthwise direction. The reading unit 2 includes spacer members 5 at two ends. The spacer members 5 will be described later.

A worm gear 7 is attached to the rotation shaft of a DC motor 6. The rotation of the DC motor 6 is transferred to the reading unit 2 via a driving gear 8 and a timing belt 9, and the reading unit 2 can move along the guide shaft 10. A code wheel 11 is attached to the rotation shaft of the DC motor 6, and equally spaced lines are radially printed on a film-like disk. An encoder 12 reads the lines printed on the code wheel 11, and outputs a pulse signal corresponding to the rotation amount or displacement amount of the code wheel 11 to a control unit 15 including a processor such as a CPU 18 shown in FIG. 2. That is, the moving amount of the reading unit 2 is read by the encoder 12 as the rotation amount or displacement amount of the code wheel 11, and is output to the control unit 15. The control unit 15 decides a pulse signal application amount, performs rotation control of the DC motor 6, and thus can control the movement of the reading unit 2. The movement control of the reading unit 2 is performed when, for example, adjusting the original reading timing of the reading unit 2. With this arrangement, the reading position of the reading unit 2 in the sub-scanning direction and the reading timing by the LED light source 13 and the line sensor 2c can be synchronized to reduce a shift of the reading position.

An image processing unit 16 performs correction of data corresponding to an uneven portion of an original on image data acquired by the reading operation of the reading unit 2. For example, the image processing unit 16 performs data processes such as interpolation and replacement based on pixel data positioned at the two ends of a portion detected as an uneven portion of an original. In addition, the image processing unit 16 can perform various image processes such as shading correction and surface preparation under the control of the control unit 15. A storage unit 17 stores, for example, image data having undergone image processing by the image processing unit 16, and an externally received job. The storage unit 17 can also store various setting contents (for example, reading resolution and monochrome/color mode) in the reading operation of the reading unit 2.

In addition to the above-described operation, the control unit 15 can perform centralized control of the respective units of the overall image reading apparatus 100. The image reading apparatus 100 includes a general-purpose ROM and RAM in addition to the blocks shown in FIG. 2. For example, the ROM stores a program for operating the image reading apparatus 100 to implement an operation according to this embodiment. By loading the program into the RAM and executing it, the control unit 15 can implement each processing of a flowchart to be described later. The image reading apparatus 100 also includes a communication interface for performing communication with the outside. The image reading apparatus 100 can receive an image reading instruction and a job from an external apparatus such as a PC via, for example, a USB cable or a network, and can transmit image data acquired by a reading operation to an external apparatus.

The image reading apparatus 100 includes a display unit that displays a user interface screen for accepting various settings regarding image reading from a user. In this embodiment, for example, when performing image reading processing of an original, the user sets, on the user interface screen, a mode in which correction of a read image obtained by reading an uneven portion of the original is performed.

FIG. 3 is a view for explaining the angle changing mechanism of the reading unit 2. FIG. 3 is a view showing the image reading apparatus 100 when viewed from bottom to top in FIG. 1, that is, viewed from the side surface of the image reading apparatus 100. Also, FIG. 3 shows that the reading unit 2 can change, in two ways at two end positions in the sub-scanning direction, the irradiation angle of light from a light source (or the reading angle of reflected light) with respect to the original surface. Two types of arrangements will be described later. A light guide 2*a* guides light emitted by the LED light source 13 in the main scanning direction and irradiates an original 4 placed on a glass 3 from the irradiation surface. A lens array 2*b* is constituted by a unit-magnification optical system such as a rod lens array. The lens array 2*b* guides, to the line sensor 2*c*, reflected light of a width in the main scanning direction from the original. The line sensor 2*c* receives the reflected light guided by the lens array 2*b*. A CMOS, CCD, or the like is used as the line sensor 2*c*.

The spacer members 5 are arranged to keep constant the distance between the reading unit 2 and the original 4, and smoothen sliding on the glass 3. The reading unit 2 is pressed against the glass 3 by a spring (not shown) in order to tightly contact the glass 3 via the spacer members 5. The reading unit 2 can move vertically with respect to the surface of the glass 3. With this arrangement, even if components vary, the reading unit 2 can always be pressed against the surface of the glass 3 to keep constant the distance between the reading unit 2 and the original 4.

Figure 4:
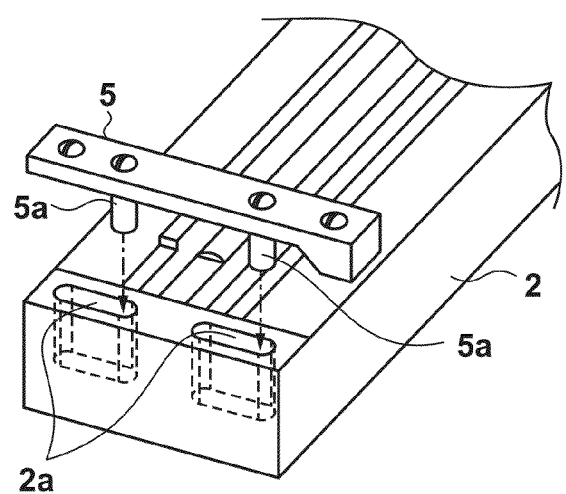
FIG. 4 is a view for explaining attachment of a spacer member to the reading unit.
Figure 5A:
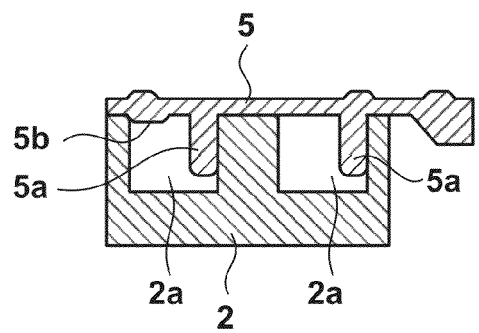
FIGS. 5A and 5B are views showing the positional relationship between the spacer member and the reading unit.
Figure 5B:
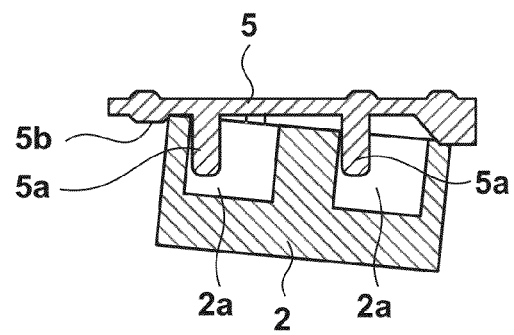

FIG. 4 is a view for explaining attachment of the spacer member 5 to the reading unit 2. FIGS. 5A and 5B are views showing the positional relationship between the spacer member 5 and the reading unit 2. As shown in FIGS. 4, 5A, and 5B, the length of the spacer member 5 in the sub-scanning direction is larger than that of the reading unit 2 in the sub-scanning direction. The thickness of one end portion of the spacer member 5 is made larger at a portion longer than the reading unit 2 in the sub-scanning direction. This thick portion will be referred to as a changing portion. The reading unit 2 has elongated circular holes 2*a*. The spacer member 5 and the reading unit 2 can be combined by fitting leg portions (bosses) 5*a* of the spacer member 5 in the elongated circular holes 2*a*. The spacer member 5 is permanently positioned with respect to the reading unit 2 in the main scanning direction by the elongated circular holes 2*a*, and is movable in the sub-scanning direction.

In this embodiment, the spacer member 5 and the reading unit 2 can mutually slide in the sub-scanning direction. The position of the spacer member 5 changes by this sliding operation, enabling a plurality of (two) states different in irradiation angle with respect to the glass 3. The state of the reading unit 2 on the left side with respect to an arrow in FIG. 3 is a normal reading state and is a state before the start of the above-described sliding operation, and the reading unit 2 is parallel to the glass 3. To the contrary, the state on the right side with respect to the arrow in FIG. 3 is a state upon completion of the above-described sliding operation, and the reading unit 2 has a predetermined inclination with respect to the glass 3. As the inclination of the reading unit 2 is larger, the paper wrinkle (unevenness) of an original can be detected at higher accuracy.

Generally, when the reading unit 2 is inclined, the distance between the lens array 2*b* and the original surface changes and the original surface goes out of focus, decreasing the reading resolution. However, a change of the distance between the lens array 2*b* and the original surface can be reduced by constituting a portion near the lens array 2*b* as the center of rotation and inclining the reading unit 2, as shown in FIG. 3. When the center of rotation cannot be set at a portion near the lens array 2*b*, an angle complying with the performance of the reading unit 2 may be set. In this embodiment, for example, the inclination is set to be 6°, and both detection of unevenness of an original and the reading resolution are satisfied.

In this embodiment, as shown in FIG. 3, the reading unit 2 moves at the time of reading scanning, and the spacer member 5 collides against a housing 1 or an abutment portion fixed to the housing 1, thereby changing between the two states described above. More specifically, when the reading unit 2 moves from the left side to the right side in FIG. 3 (for example, forward pass) and collides against the right wall of the housing 1, the inertial force acts, the reading unit 2 tries to further move in the moving direction along the shape of the elongated circular hole 2*a*, and the reading unit 2 runs on the changing portion of the spacer 5. As a result, the positional relationship between the reading unit 2 and the spacer 5 changes to the state on the right side of FIG. 3, and the irradiation angle with respect to the original surface can be changed. From the state on the right side of FIG. 3, the reading unit 2 moves from the right side to the left side in FIG. 3 (for example, backward pass). When the reading unit 2 collides against the left wall of the housing 1 after movement, the inertial force acts, the reading unit 2 tries to further move in the moving direction along the shape of the elongated circular hole 2*a*, and the reading unit 2 slides off the changing portion of the spacer 5. As a result, the positional relationship between the reading unit 2 and the spacer 5 changes to the state on the left side of FIG. 3, and the irradiation angle with respect to the original surface can be changed.

In this embodiment, the irradiation angle with respect to the original surface is changed by the above-described operation. However, since the portion at which the reading unit 2 collides against the wall surface of the housing 1 exists in a region other than the image reading region, the irradiation angle is not changed during image reading. Since the spacer 5 has a projection 5b, as shown in FIGS. 5A and 5B, the projection 5b can prevent an erroneous change of the position of the spacer 5 during image reading.

Although the irradiation angle is changed by causing the reading unit to collide against the housing in the above-described manner in the above embodiment, the irradiation angle changing method is not limited to this. For example, a driving mechanism such as a motor is arranged to set the reading unit from the state on the left side of FIG. 3 to the state on the right side. The driving mechanism spontaneously operates to change the state of the reading unit without causing the reading unit to collide against the wall surface. Even in this case, the irradiation angle may be changed outside the reading region, as in the above-described embodiment. In other words, in the method of causing the reading unit to collide against the wall surface, as in the above-described embodiment, the irradiation angle of the light source can be changed even if a driving mechanism as described above is not adopted.

An original unevenness detection principle will be explained. The unevenness of an original is, for example, a crease or a wrinkle on an original. Light emerging from the light guide 2a of the reading unit 2 is diffused on the original surface, and light in the lens incident direction enters the lens and is read by the image sensor. The diffuse light reflected by the original surface becomes strongest when incident light matches the normal direction of the original surface, and becomes weaker as the angle from the normal direction becomes larger. This is called Lambert reflection, which can be applied to general original reading.

Figure 6:
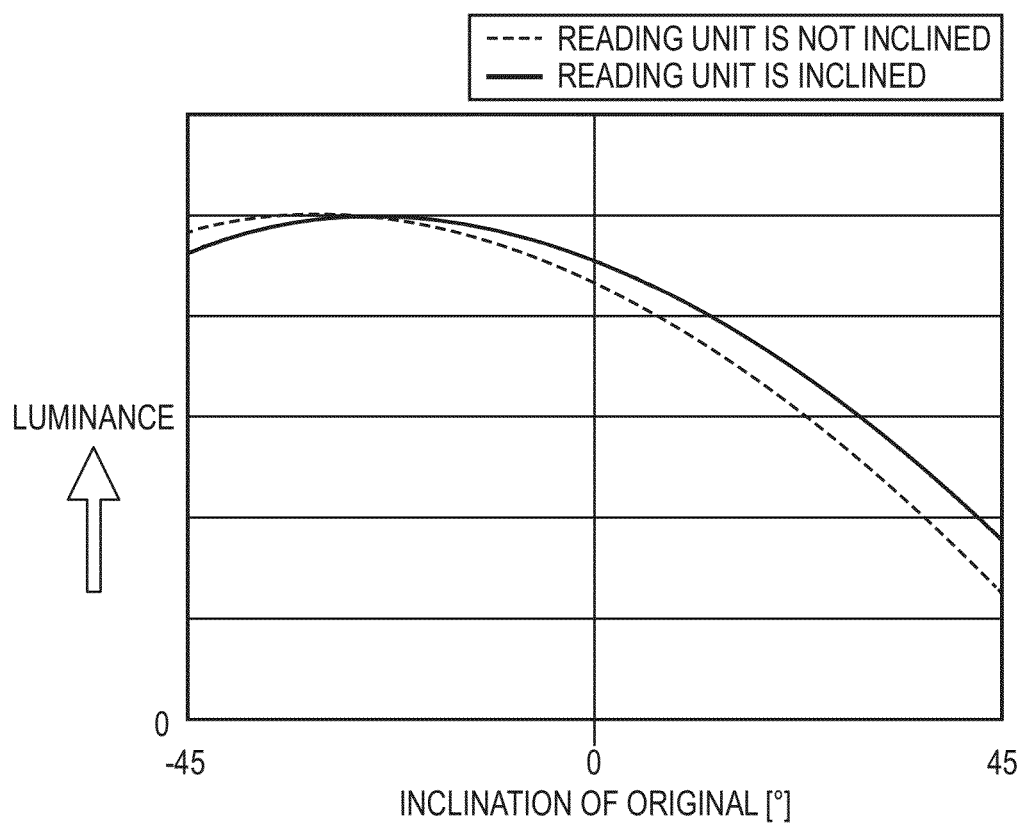
FIG. 6 is a graph showing the relationship between the inclination of an original and the luminance.

FIG. 6 is a graph when the relationship between the inclination of an original and the luminance is compared between the normal reading state and the inclined state shown in FIGS. 3, 5A, and 5B, based on Lambert's cosine law. As shown in FIG. 6, the luminance value changes in accordance with the angle of an original. The luminance difference between the normal reading state and the inclined state changes depending on the angle of the original. The unevenness of the original represents a state in which the original is not flat but is inclined. The luminance difference between the two states is constant at a flat portion of the original free from unevenness, but the luminance difference changes at an uneven portion. In this embodiment, the uneven portion of the original is specified based on this principle.

Figure 7A:
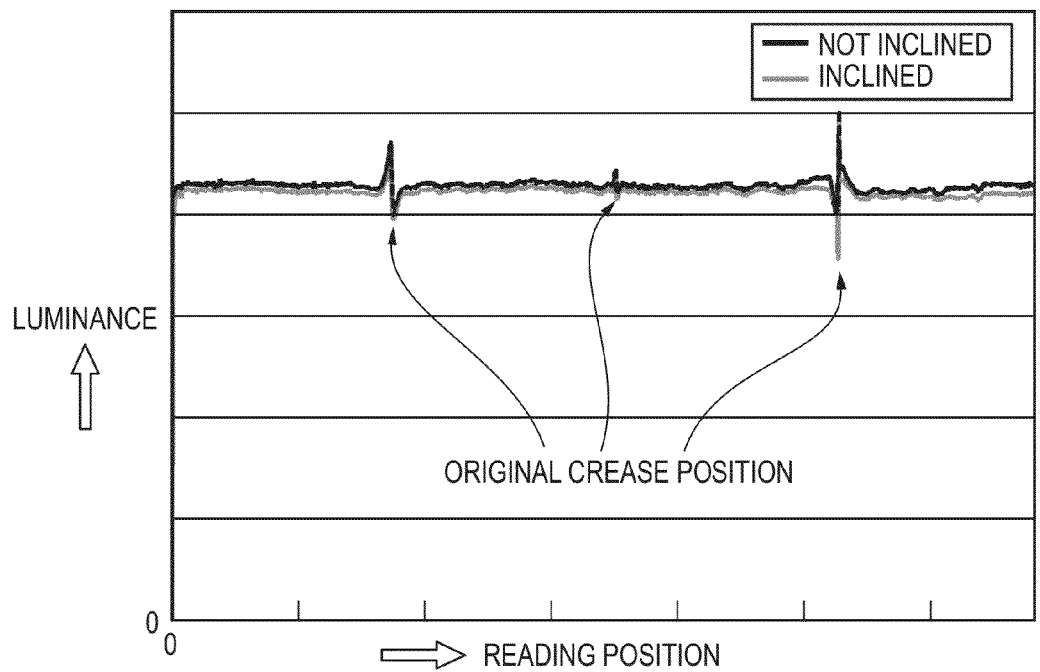
FIGS. 7A and 7B are graphs showing the results of reading an original including an uneven portion in the respective states of the reading unit.
Figure 7B:
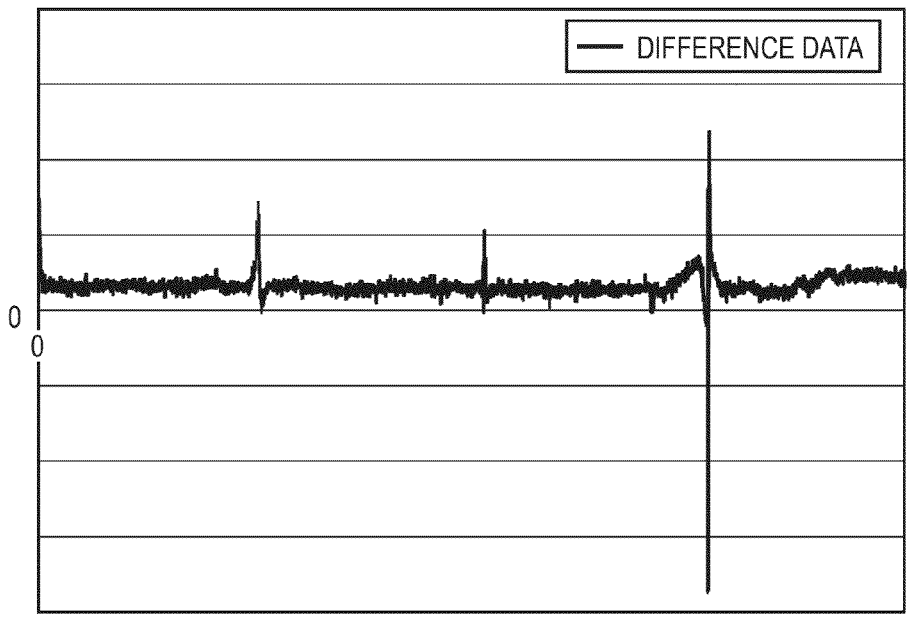

FIGS. 7A and 7B are graphs showing the results of reading an original including a crease portion (uneven portion) in the respective states of the reading unit 2. FIG. 7A is a graph showing changes of the luminance value in the respective states of the reading unit 2. FIG. 7B is a graph showing the difference between luminance values in the respective states. As shown in FIG. 7B, the luminance difference between the two states changes at the crease portion of the original.

FIG. 8 is a flowchart showing the control procedures of image reading processing according to this embodiment. Each processing in FIG. 8 is implemented by, for example, reading out a program stored in the ROM or the like to the RAM and executing it by the control unit 15.

First, when executing image reading processing, it is determined whether the original unevenness reduction function has been set to be valid or invalid (step S801). In step S801, for example, when the user selects, on a user interface screen displayed on the display unit of the image reading apparatus 100, a predetermined mode in which correction of a read image is performed, it is determined that the original unevenness reduction function is set to be valid.

Figure 9A:
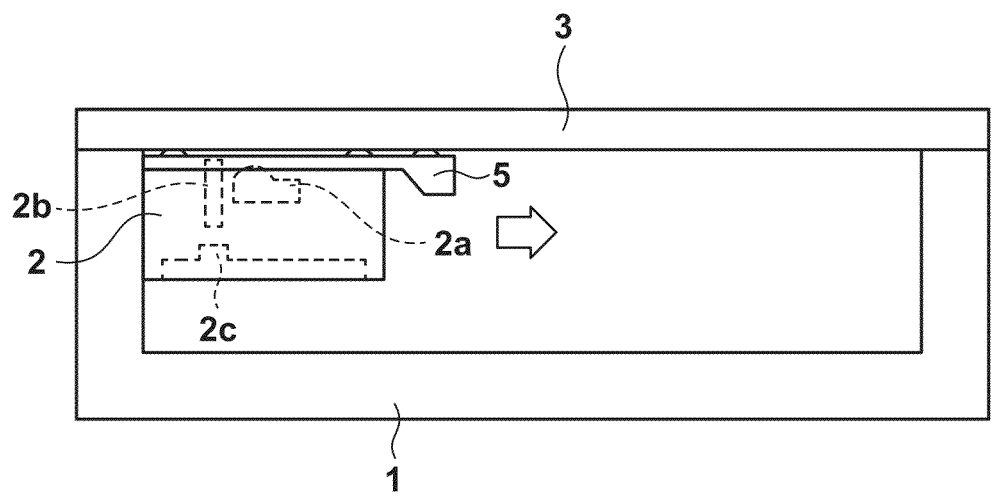
FIGS. 9A and 9B are views showing changing of the angle of the reading unit.

If it is determined in step S801 that the original unevenness reduction function has been set to be invalid, the reading unit 2 is driven in the forward direction (step S810), and image reading processing of the original is performed in the normal reading state (step S811). At this time, the reading unit 2 is in the normal reading state shown in FIG. 9A. If the reading unit 2 reaches the end portion of the image reading region in the sub-scanning direction, it is driven in the backward direction (step S812) and returned to the standby position. Then, the processing shown in FIG. 8 ends.

Figure 9B:
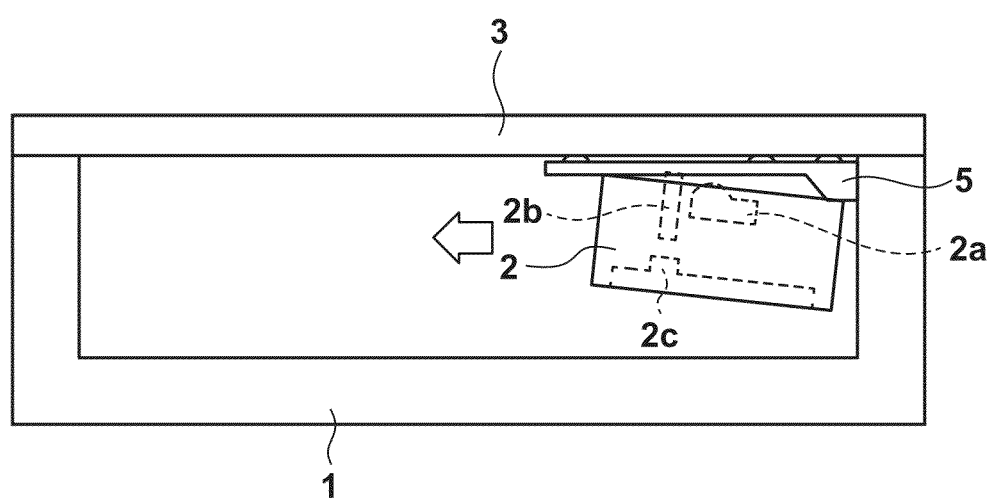

If it is determined in step S801 that the original unevenness reduction function has been set to be valid, the reading unit 2 is driven in the forward direction (step S802), and image reading processing of the original is performed in the normal reading state (step S803). At this time, the reading unit 2 is in the normal reading state shown in FIG. 9A. When it is determined that the original unevenness reduction function has been set to be valid, even if the reading unit 2 reaches the end portion of the image reading region in the sub-scanning direction, the reading unit 2 is not stopped but is caused to collide against the wall surface (or the abutment portion) of the housing 1 outside the image reading region. Then, the reading unit 2 is inclined, as shown in FIG. 9B, and the irradiation angle with respect to the original surface changes (step S804). Thereafter, the reading unit 2 is driven in the backward direction (step S805), and image reading processing for a comparison image is performed (step S806). The image reading processing for a comparison image is acquisition of luminance data in a state in which the irradiation angle with respect to the original surface is changed. After the processing in step S806, the reading unit 2 is caused to collide against the wall surface (or the abutment portion) of the housing 1 outside the image reading region, and is returned to the standby position as the normal reading state shown in FIG. 9A for the purpose of next image reading processing (step S807). The wall surface at this time is a wall surface positioned to face the wall surface against which the reading unit 2 collided in step S804.

The difference between luminance values is acquired from luminance data obtained from image data acquired by the image reading processing in step S803, and luminance data acquired in step S806, and the uneven portion of the original is detected (step S808). That is, as described with reference to FIG. 7B, when the original is read while changing the irradiation angle with respect to the original surface, difference data increases at the uneven portion (for example, crease) of the original. Therefore, the uneven portion of the original can be detected from the difference between luminance data acquired in step S803, and luminance data acquired in step S806 upon changing the irradiation angle in step S804.

At this time, a reading position in the sub-scanning direction at which the difference between luminance values is larger than a threshold may be detected as an uneven portion of the original. After detecting an uneven portion of the original, the image processing unit 16 corrects image data of the uneven portion (step S809). In the correction, for example, data processes such as interpolation and replacement based on pixel data at the two ends of the uneven portion are performed.

Note that data of a correction target in step S809 may be data obtained by normal reading in step S803, or data obtained by comparison image reading in step S807. When correction is performed on data corresponding to normal reading in step S803, normal processing can be applied even without performing special processing along with a change of the irradiation angle for various processes such as color correction. More specifically, data obtained by comparison image reading in step S807 is used to detect an uneven portion of the original, and is not used for actual correction. Thus, after an uneven portion is properly detected, correction can be easily performed. In addition to an uneven portion, a correction target such as dirt may or may not be detected depending on the irradiation angle. Hence, the regions of various correction targets other than an uneven portion may be detected by changing the irradiation angle.

As the correction target in step S809, correction is not limited to either of data acquired in step S803 and data acquired in step S806. For example, when the region of a correction target such as dirt exists in a read image obtained in step S803, a read image obtained in step S806 may be used for this portion, and a read image obtained in step S803 may be used for the remaining portions.

In this embodiment, the original unevenness reduction function may be always valid or may be changed in accordance with selection by the user, as described above.

As described above, according to this embodiment, one reading unit can read an original a plurality of times while changing the irradiation angle with respect to the original surface. An uneven portion of the original in a read image obtained by reading the original can be detected from the difference between data obtained by the plurality of reading operations. This uneven portion is decided as the target region of image processing (correction). Therefore, even if a plurality of reading units with different irradiation angles are not arranged, the region of a correction target in a read image can be appropriately detected. That is, one reading unit can take two illumination (reading) states in processing of detecting an uneven portion of an original, so a component such as a light source need not be added for this processing.

In the above-described embodiment, an uneven portion of an original is detected by changing the angle of the reading unit including both the light source and sensor for reading. However, the present invention is not limited to this, and the same effects as those described above can be obtained by changing only the irradiation angle of the light source or only the detection angle of the sensor.

The above-described embodiment has explained an example in which the control unit 15 in the reading control performs reading control of the reading unit and detection processing of an uneven portion of an original. However, the present invention is not limited to this, and an external apparatus such as a host computer connected to the reading apparatus may perform these processes. Further, various methods are conceivable for sharing of processing between the external apparatus and the reading apparatus. For example, the external apparatus receives a reading instruction and an original unevenness detection mode instruction in accordance with instructions from the user, and transmits these instructions to the reading apparatus. The reading apparatus executes the processes in steps S801 to S807 of FIG. 8. The external apparatus acquires a plurality of read images corresponding to different irradiation angles and performs detection processing of an uneven portion of the original in step S808, and further performs correction in step S809.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-048069, filed Mar. 11, 2014, which is hereby incorporated by reference herein in its entirety.

What is claimed is:

1. A reading apparatus including a light source configured to irradiate an original on an original table with light, and a sensor configured to receive light reflected by the original, to read the original, comprising:
   a changing unit configured to execute control for changing an irradiation angle of the light source with respect to the original;
   an acquisition unit configured to acquire read images of the original corresponding to respective irradiation angles changed by said changing unit, based on reflected beams that correspond to the respective irradiation angles and have been received by the sensor; and
   a detection unit configured to detect a region of a correction target on the original based on the read images acquired by said acquisition unit,
   wherein the reading apparatus reads the original by relatively moving the light source and the sensor with respect to the original table,
   and wherein said changing unit executes the control to change between a plurality of the irradiation angles for one light source, when a direction of reading scanning of the light source and the sensor changes.

2. The apparatus according to claim 1, wherein said detection unit detects, as the region of the correction target, a region of the original that corresponds to an uneven portion in the read images.

3. The apparatus according to claim 2, wherein said detection unit detects, as the uneven portion of the original, a region where a difference between luminance values is larger than a threshold in the read images corresponding to the respective irradiation angles.

4. The apparatus according to claim 1, wherein said changing unit executes the control in a case where the reading apparatus is in a predetermined mode for performing detection by said detection unit.

5. The apparatus according to claim 4, wherein said changing unit executes the control so as to change the irradiation angle of the light source between an irradiation angle in a case in which the reading apparatus is not in the predetermined mode, and an irradiation angle in a case in which the reading apparatus is in the predetermined mode.

6. The apparatus according to claim 4, wherein said detection unit detects the region in a read image that is acquired by said acquisition unit and corresponds to the irradiation angle in a case in which the reading apparatus is not in the predetermined mode.

7. The apparatus according to claim 1, further comprising a correction unit configured to correct read image data of the region detected by said detection unit.

8. The apparatus according to claim 1, wherein said changing unit changes the irradiation angle by changing angles of both the light source and sensor with respect to the original.

9. The apparatus according to claim 1, wherein said changing unit changes between the plurality of irradiation angles at a position other than a reading region by the reading apparatus.

10. The apparatus according to claim 1, wherein
the reading apparatus includes a first member in which the light source and the sensor are arranged, and a second member that slides on the original table,
the first member is attached to the second member so as to be able to slide on the second member, and
the irradiation angle is changed by a sliding operation.

11. The apparatus according to claim 10, wherein the irradiation angle is changed between two types of irradiation angles respectively corresponding to a state before a start of the sliding operation of the first member on the second member, and a state after a completion of the sliding operation.

12. The apparatus according to claim 11, wherein said changing unit changes the irradiation angle by an inertial force generated by stopping move of the first member.

13. The apparatus according to claim 12, wherein said changing unit changes the irradiation angle by causing the first member to collide against a wall surface.

14. A reading control method of a reading apparatus including a light source configured to irradiate an original on an original table with light, and a sensor configured to receive light reflected by the original, comprising:
a changing step of executing control for changing an irradiation angle of the light source with respect to the original;
an acquisition step of acquiring read images of the original corresponding to respective irradiation angles changed in the changing step, based on reflected beams that correspond to the respective irradiation angles and have been received by the sensor; and
a detection step of detecting a region of a correction target on the original based on the read images acquired in the acquisition step,
wherein the reading apparatus reads the original by relatively moving the light source and the sensor with respect to the original table,
and wherein in the changing step, the control is executed to change between a plurality of the irradiation angles for one light source, when a direction of reading scanning of the light source and the sensor changes.

15. The method according to claim 14, wherein in said detection step, a region of the original that corresponds to an uneven portion, is detected as the region of the correction target in the read images.

16. The method according to claim 15, wherein in said detection step, a region where a difference between luminance values is larger than a threshold in the read images corresponding to the respective irradiation angles, is detected as the uneven portion of the original.

17. The method according to claim 14, wherein in said changing step, the control is executed in a case where the reading apparatus is in a predetermined mode for performing detection in the detection step.

18. The method according to claim 14, further comprising a correction step of correcting read image data of the region detected in the detection step.

19. The method according to claim 14, wherein
the reading apparatus includes a first member in which the light source and the sensor are arranged, and a second member that slides on the original table,
the first member is attached to the second member so as to be able to slide on the second member, and
the irradiation angle is changed by a sliding operation.

20. The method according to claim 19, wherein the irradiation angle is changed between two types of irradiation angles respectively corresponding to a state before a start of the sliding operation of the first member on the second member, and a state after a completion of the sliding operation.

* * * * *